(12) United States Patent
Riehle et al.

(10) Patent No.: US 10,066,550 B2
(45) Date of Patent: Sep. 4, 2018

(54) FAN BY-PASS DUCT FOR INTERCOOLED TURBO FAN ENGINES

(71) Applicant: Rolls-Royce North American Technologies, Inc., Indianapolis, IN (US)

(72) Inventors: Bradford J. Riehle, Avon, IN (US); James C. Loebig, Greenwood, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 450 days.

(21) Appl. No.: 14/709,826

(22) Filed: May 12, 2015

(65) Prior Publication Data
US 2016/0222886 A1 Aug. 4, 2016

Related U.S. Application Data

(60) Provisional application No. 61/993,665, filed on May 15, 2014.

(51) Int. Cl.
| | |
|---|---|
| *F01D 25/08* | (2006.01) |
| *F02C 7/143* | (2006.01) |
| *F02K 3/077* | (2006.01) |
| *F02K 3/115* | (2006.01) |
| *F02C 7/18* | (2006.01) |

(Continued)

(52) U.S. Cl.
CPC .............. *F02C 7/143* (2013.01); *F02C 7/18* (2013.01); *F02K 3/02* (2013.01); *F02K 3/077* (2013.01); *F02K 3/105* (2013.01); *F02K 3/115* (2013.01); *F05D 2220/323* (2013.01); *F05D 2220/36* (2013.01); *F05D 2260/204* (2013.01); *F05D 2260/211* (2013.01); *F05D 2260/213* (2013.01); *Y02T 50/676* (2013.01)

(58) Field of Classification Search
CPC ........... F02K 3/105; F02K 3/077; F02K 3/115
See application file for complete search history.

(56) References Cited

U.S. PATENT DOCUMENTS

| 4,187,675 A | 2/1980 | Wakeman |
| 4,254,618 A | 3/1981 | Elovic |

(Continued)

FOREIGN PATENT DOCUMENTS

| EP | 1944475 A2 | 7/2008 |
| EP | 2910887 A1 | 8/2015 |

OTHER PUBLICATIONS

Extended European Search Report for EP 15167747.3 dated Oct. 19, 2015.

*Primary Examiner* — Logan Kraft
*Assistant Examiner* — Jason Fountain
(74) *Attorney, Agent, or Firm* — Fishman Stewart PLLC

(57) ABSTRACT

An improved system, apparatus and method for intercooling a turbo fan engine, and more specifically, a system for intercooling a turbo fan engine employing a secondary bypass duct that minimizes pressure losses. The secondary bypass duct is radially inwardly disposed from a fan bypass duct and receives fan bypass air through an inlet. The portion of fan bypass air flows through one or more microchannel or minichannel heat exchangers. The secondary bypass duct has an outlet in communication with the bypass air stream downstream of the throat of a fan bypass nozzle. The secondary bypass air is accelerated at the exit to create thrust.

18 Claims, 4 Drawing Sheets

(51) Int. Cl.
*F02K 3/02* (2006.01)
*F02K 3/105* (2006.01)

(56) References Cited

U.S. PATENT DOCUMENTS

| | | | | |
|---|---|---|---|---|
| 5,269,135 | A * | 12/1993 | Vermejan | F02C 7/04 60/226.1 |
| 6,134,880 | A | 10/2000 | Yoshinaka | |
| 7,607,308 | B2 | 10/2009 | Kraft et al. | |
| 7,810,312 | B2 * | 10/2010 | Stretton | F02C 7/141 60/226.1 |
| 7,861,510 | B1 | 1/2011 | Wilson, Jr. et al. | |
| 8,109,324 | B2 * | 2/2012 | Farid | F28D 15/0266 165/104.33 |
| 2005/0150970 | A1 | 7/2005 | Beutin et al. | |
| 2007/0245739 | A1 | 10/2007 | Stretton et al. | |
| 2009/0007570 | A1 | 1/2009 | Ranganathan | |
| 2013/0239542 | A1 * | 9/2013 | Dasgupta | F02C 7/143 60/39.093 |

* cited by examiner

FAN BY-PASS DUCT FOR INTERCOOLED TURBO FAN ENGINES

CROSS-REFERENCE TO RELATED APPLICATIONS

This application claims priority to U.S. Provisional Patent Application No. 61/993,665 filed May 15, 2014, the contents of which are hereby incorporated in their entirety.

GOVERNMENT RIGHTS

This disclosure was made with government support under FA8650-09-D-2921 awarded by US Air Force. The government has certain rights in the disclosure.

FIELD OF TECHNOLOGY

An improved system for intercooling a turbo fan engine, and more specifically, a system for intercooling a turbo fan engine employing a secondary bypass duct that minimizes pressure losses.

BACKGROUND

Gas turbines typically include a compressor, a combustor and a turbine. The compressor pressurizes air flowing into the turbine. Pressurized air is discharged from the compressor and flows to the combustor. Air entering the combustor is mixed with fuel and combusted. Gas turbine engines operate by combusting fuel with compressed air to create heated gases. The heated gases are used to drive a turbine for rotating a fan to provide air to the compressor. Additionally, the heated gases are used to drive a turbine to power the compressor. In a turbo fan engine a low-pressure turbine powers a fan which produces a majority of the thrust.

The fan pushes air into a nacelle where part of the incoming air is directed to the core engine while the majority of the incoming air bypasses the core engine. The air that bypasses the core engine is known as bypass air, and is responsible for majority of the thrust for propelling the aircraft in flight. The air which is directed to the core engine is compressed and combusted and is typically referred to as the core flow. In some core engines, there is an intermediate compressor and a high pressure compressor. The efficiency of the core engine is limited by the air temperature entering the high pressure compressor. The high pressure compressor will work more efficiently if it is compressing cooler air. By cooling the core flow, the cycle is changed because cooler air will also allow the cycle to go to a higher pressure.

Heat exchangers can be employed in a gas turbine engine for the purpose of transferring heat between the core air stream and a fan bypass airstream. Some systems place the heat exchanger directly in the flow of the fan bypass airstream. Although this type of arrangement provides sufficient airflow for cooling there is a penalty in drag and pressure loss. Providing sufficient airflow in a secondary duct is also a challenge because of flow rate requirements for meaningful heat transfer. Dump losses result when fan bypass air is bled into a secondary duct. The heat exchanger can also cause a significant pressure loss. When the cooling benefits have been obtained through the use of a heat exchanger they are at least partially offset by propulsion losses.

Pressure losses result when the dynamic pressure of the air stream becomes static pressure as the air enters the chamber as well as the resistance in flow from the heat exchanger. Lost thrust can occur when the air stream is discharged from the secondary duct. However it would be desirable to provide a method and system for intercooling a turbo fan engine by employing a secondary duct with suitable flow and minimal pressure loss.

For the purposes of this discussion, the definition of a microchannel heat exchanger may be a heat exchanger which contains one or more passages with hydraulic diameters in the range of 10 microns to 200 microns. The definition of minichannel heat exchanger may be a heat exchanger which contains one or more passages with hydraulic diameters in the range of 200 microns to 3000 microns.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

Figure 1:
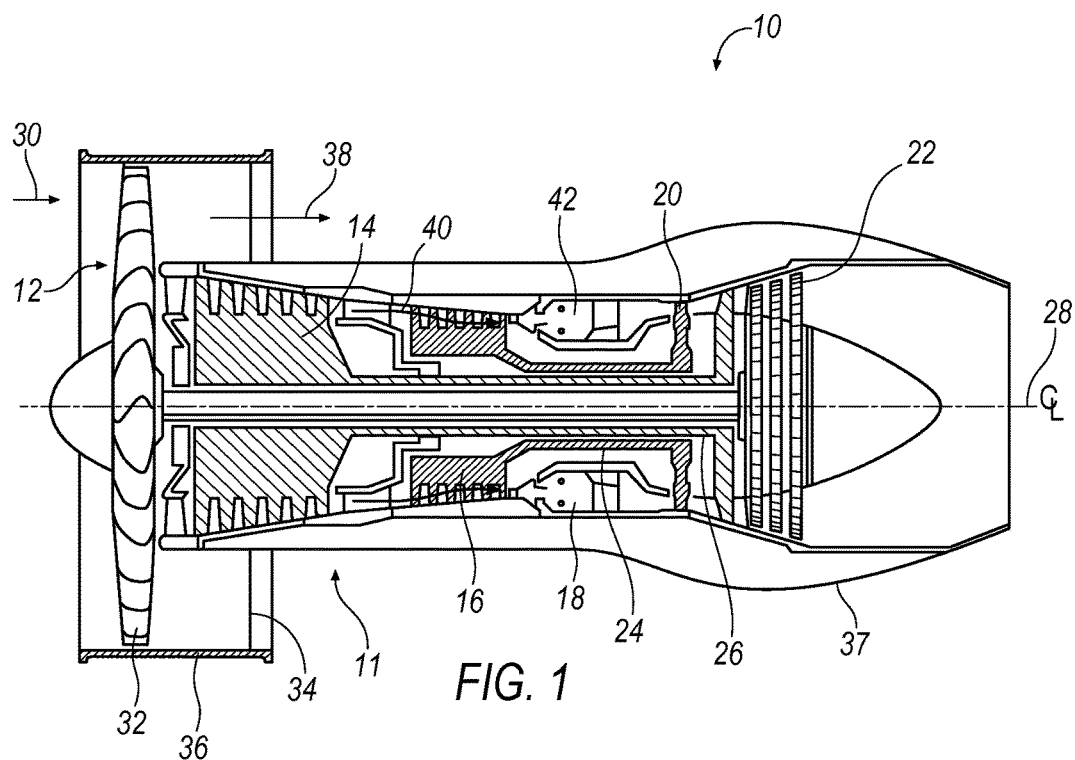
FIG. 1 illustrates an exemplary gas turbine engine.

For the purposes of promoting an understanding of the principles of the embodiments, reference will now be made to the embodiments illustrated in the drawings and specific language will be used to describe the same. It will nevertheless be understood that no limitation of the scope of the embodiments is thereby intended. Any alterations and further modifications in the described embodiments, and any further applications of the principles of the embodiments as described herein are contemplated as would normally occur to one skilled in the art to which the embodiment relates.

DETAILED DESCRIPTION

Exemplary illustrations of the improved system, apparatus and method for intercooling a turbo fan engine is disclosed, and more specifically, a system for intercooling a turbo fan engine employing a secondary bypass duct that minimizes pressure losses. The secondary bypass duct is radially inwardly disposed from a fan bypass duct and receives fan bypass air through an inlet. The portion of fan bypass air in the secondary bypass duct flows through a microchannel or minichannel heat exchanger to transfer heat from a working fluid or heat transfer fluid to the secondary air stream. The secondary bypass duct has an outlet in communication with the bypass air stream downstream of the throat of a fan bypass nozzle. The secondary bypass air is accelerated at the exit to create thrust.

FIG. 1 illustrates a gas turbine engine 10, which includes a fan 12, a low pressure compressor and a high pressure compressor, 14 and 16, a combustor 18, and a high pressure turbine and low pressure turbine, 20 and 22, respectively. The high pressure compressor 16 is connected to a first rotor shaft 24 while the low pressure compressor 14 is connected to a second rotor shaft 26. The shafts extend axially and are parallel to a longitudinal center line axis 28.

Ambient air 30 enters the fan 12 and is directed across a fan rotor 32 in an annular fan bypass duct 34, which in part is circumscribed by nacelle 36. The bypass airflow 38 provides engine thrust while the primary gas stream 40 is directed to the combustor 18 and the high pressure turbine 20.

The fan nacelle 36 is spaced radially outwardly from the core casing 37 to define an annular bypass duct 34 there between. During operation, the core engine 11 powers the fan 12 which pressurizes ambient air 30 to produce propulsion thrust in the fan air 38 bypassing the core engine 11 and discharged from the fan exhaust nozzle (not shown).

Figure 2:
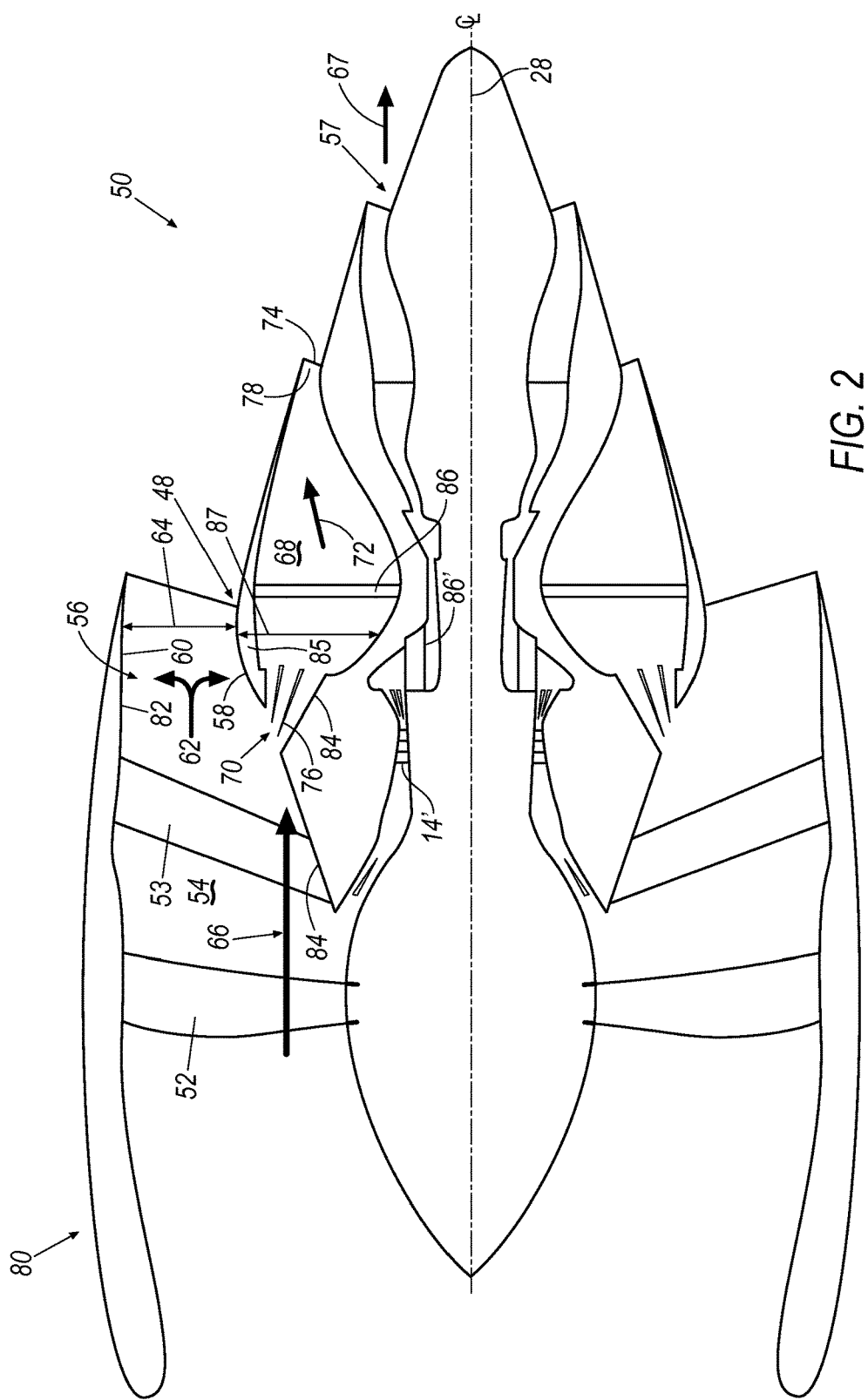
FIG. 2 illustrates an exemplary short nacelle turbo and engine having a secondary bypass duct.

Referring now also to FIG. 2, an exemplary turbo fan engine 50 is shown having a secondary bypass duct 68. A nacelle 80 is shown having a fan nozzle 56 spaced upstream from the core nozzle 57, and the fan bypass airflow 66 is discharged separately from and surrounding core exhaust 67. In a long nacelle turbo fan engine (not shown), the fan nacelle extends aft of the core nozzle to provide a single common nozzle through which both the fan bypass air and core exhaust are discharged from the engine.

The exemplary turbo fan engine 50 includes a fan 52 for providing propulsion to an aircraft (not shown). Air from the fan 52 which does not become part of the core flow is referred to as bypass airflow 66. The bypass airflow 66 travels through an annular fan bypass duct 54 formed of an inner shroud 58 and outer shroud 60. The outer shroud 60 may be the inner surface 82 of the nacelle 80. The bypass air 66 is accelerated by a converging section 62 of a fan bypass nozzle 56 located downstream of the fan 52.

A secondary bypass duct 68 is radially inwardly spaced from the bypass duct 54. The secondary bypass duct 68 is an annular duct formed of an outer cowl 85 radially spaced from an inner cowl 84. In one embodiment, the cowl 84 may be the core cowl 84. In another embodiment, the outer cowl 85 forms at least part of the inner surface 58 of the fan bypass duct 54. In yet another embodiment, fan bypass nozzle 56 has an inner radius defined by the core cowl 84.

An inlet 70 is in communication with the fan bypass duct 54 for directing a portion of the fan bypass air 66 an into the secondary bypass duct 68. In one embodiment, a diffuser 76 is provided for decelerating the secondary bypass air 72. Pressure losses are minimized by fully or partially diffusing the fan bypass air 66.

A heat exchanger 86, an example of which is a microchannel or minichannel heat exchanger, embodiments of which are disclosed in commonly owned U.S. Patent Application Ser. No. 61/943,035 titled Single Phase Micro/Mini Channel Heat Exchangers For Gas Turbine Intercooling, and U.S. Patent Application Ser. No. 61/943,064 titled Microchannel Heat Exchangers For Gas Turbine Intercooling And Condensing, the contents of which are incorporated herein by reference in their entirety. The heat exchanger 86 is disposed within the secondary bypass duct 68. The advantage of a microchannel or minichannel heat exchanger 86 is the low pressure drop across the heat exchanger 86. The bypass air 66 is slowed by the diffuser 76 and is directed through the heat exchanger 86 to cool the working fluid or heat transfer fluid heated by a heat exchanger disposed in a core flow (not shown).

In one embodiment, the core flow heat exchanger 86' is disposed between an intermediate pressure compressor 14' and a high pressure compressor 16' to cool the core flow 67. A cooler inlet air temperature changes the cycle by allowing the high pressure compressor to work at a higher pressure ratio. A higher pressure ratio in the high pressure compressor increases the efficiency of the engine 50. The core flow heat exchanger 86' may or may not evaporate the working fluid or heat transfer fluid. The bypass duct heat exchanger 86 may or may not condense the working fluid or heat transfer fluid. The heat transfer fluid could be air, liquid, gas, or a combination thereof.

The heated secondary bypass air 72 exits through an outlet 74 in communication with the bypass airstream 66 downstream of the throat 64 of the fan bypass nozzle 56. A secondary bypass duct nozzle 78 accelerates the secondary bypass air 72 thus providing thrust. The present system minimizes pressure loss, enabling the system to realize the benefits of intercooling while using a significant amount of fan bypass air to cool the core flow via a closed loop cooling circuit which utilizes a working fluid or a heat transfer fluid.

A system 48 for providing intercooling to a turbo fan engine 50 comprises the fan bypass duct 54, secondary bypass duct 68 and a heat exchanger 86, an example of which is a microchannel or minichannel heat exchanger. Dump losses are reduced by providing a diffuser 76 at the inlet 70 of the secondary bypass duct 68. By accelerating the bypass air 66 bled from the fan bypass duct 54, the system is able to maximize net thrust of the cooling bypass air 72. In one embodiment the inlet 70 is located downstream of bypass duct deswirl vanes, upstream of the converging section 62 of the fan bypass nozzle 56. In another embodiment, the inlet 70 is disposed within the core cowl 84.

Figure 3:
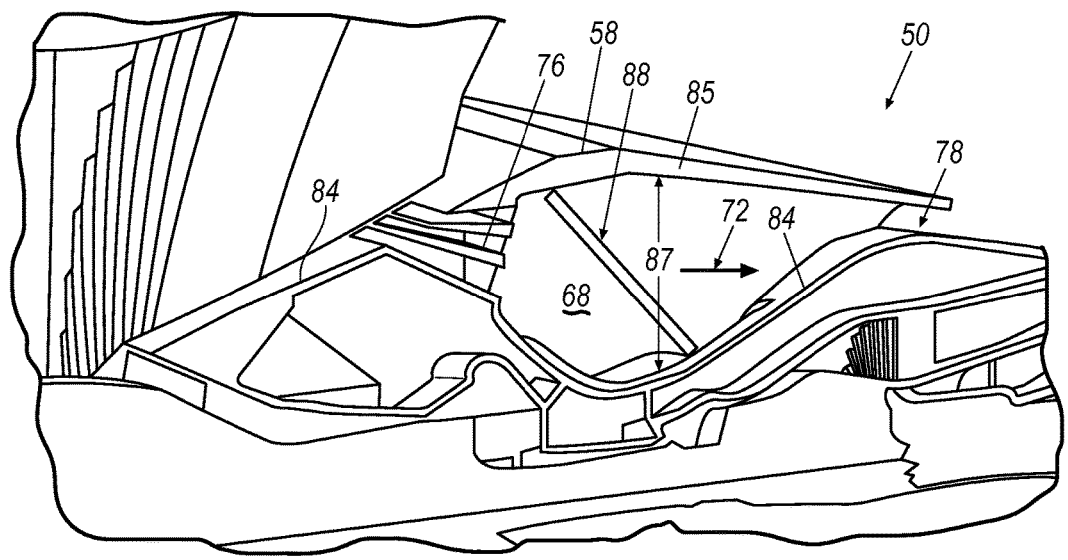
FIG. 3 illustrates an exemplary secondary bypass duct having an axial flow microchannel or minichannel heat exchanger.

In one embodiment, the secondary bypass duct 68 providing intercooling to the turbo fan engine 50 comprises an outward cowl 85 radially spaced from an inward cowl 84 to form an annulus 87. At least a portion of the outward cowl 85 forms at least a portion of the inner surface 58 of the fan bypass duct 54. The inlet 70 is in communication with the annulus 87 for directing a portion of the fan bypass air 66 into the annulus 87. An outlet 74 is spaced downstream of the throat 64 of the fan bypass nozzle 56 and outlet 74 is in communication with the fan bypass airstream 66. A microchannel or minichannel heat exchanger 86 is disposed within the annulus 87 where working fluid transfers heat from the engine 50 to the cooling air 72. The heat exchanger 86 may be arranged in various configurations other than those depicted herein. In FIGS. 2 and 3, the heat exchanger 86 is exemplarily oriented substantially perpendicular to the center line 28 of the engine 50.

Referring now also to the embodiment of FIG. 3, an exemplary secondary bypass duct 68 having a radially arranged microchannel or minichannel heat exchanger 88 is shown comprised of a plurality of segments. Air flowing over the core cowl 84 enters the diffusers 76 and into the secondary bypass duct 68. The heat exchanger 88 is disposed within the annulus 87 and normal to the flow of the secondary bypass air 72. Air exiting the secondary bypass duct 68 is accelerated by the nozzle 78 to provide thrust. In the current embodiment, the segments of the axial microchannel or minichannel heat exchanger 88 are generally pie or wedge shaped and are disposed within the annulus 87.

Figure 4:
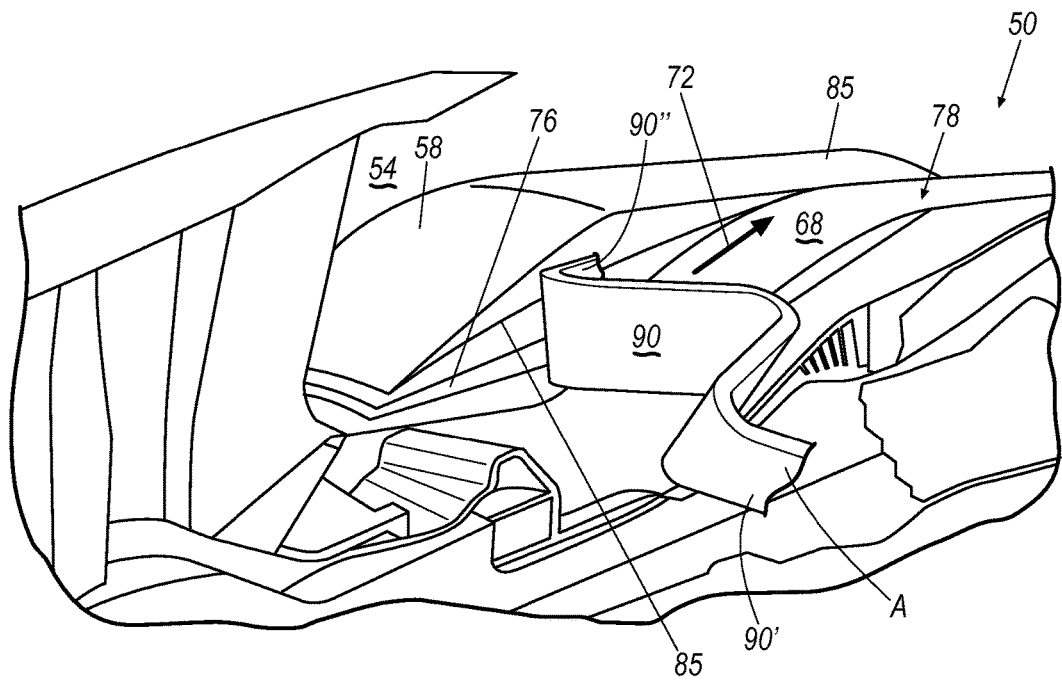
FIG. 4 illustrates an exemplary secondary bypass duct having an axial flow microchannel or minichannel heat exchanger that is pleated.

Referring now to the embodiment of FIG. 4, an exemplary secondary bypass duct 68 having an axial flow microchannel or minichannel heat exchanger 90 is shown comprised of a plurality of pleated segments 90', 90", and so on. In the present embodiment, the outer cowl 85 is spaced from the inner shroud 58 of the fan bypass duct 54. The diffuser 76 directs secondary bypass air 72 into the heat exchanger 90. The pleated or accordion like segments 90' and 90" of the heat exchanger 90 permit more surface area to increase airflow across a heat exchanger 90. The accordion segments 90' and 90" extend axially and radially in a circumferential direction around the centerline 28 of the engine 50.

Figure 5:
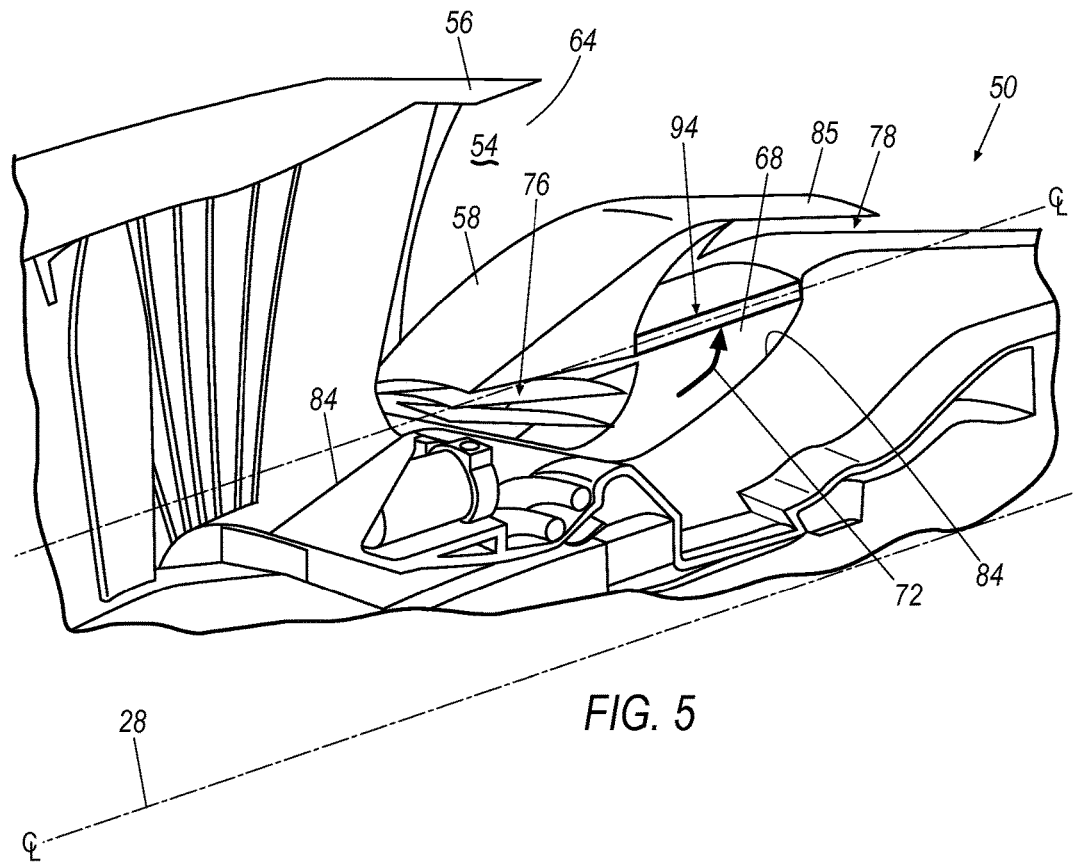
FIG. 5 illustrates an exemplary secondary bypass duct having a radial flow microchannel or minichannel heat exchanger.

Referring now to the embodiment of FIG. 5, an exemplary secondary bypass duct 68 having a radial flow microchannel or minichannel heat exchanger 94 is shown comprised of a plurality of radial segments. In the present embodiment, the outer cowl 85 is spaced from the inner shroud 58 of the fan bypass duct 54. The heat exchanger 94 is disposed generally parallel to the longitudinal axis 28 of the engine 50. The diffuser 76 directs secondary bypass air 72 into the chamber 68, however because of the orientation of heat exchanger 94, the secondary bypass air 72 must turn radially outward to flow through the heat exchanger 94. The curved cowl 84 directs flow of the secondary bypass air 72 radially outward. The nozzle 78 discharges the secondary air 72 downstream of the throat 64 of the fan bypass nozzle 56.

Figure 6:
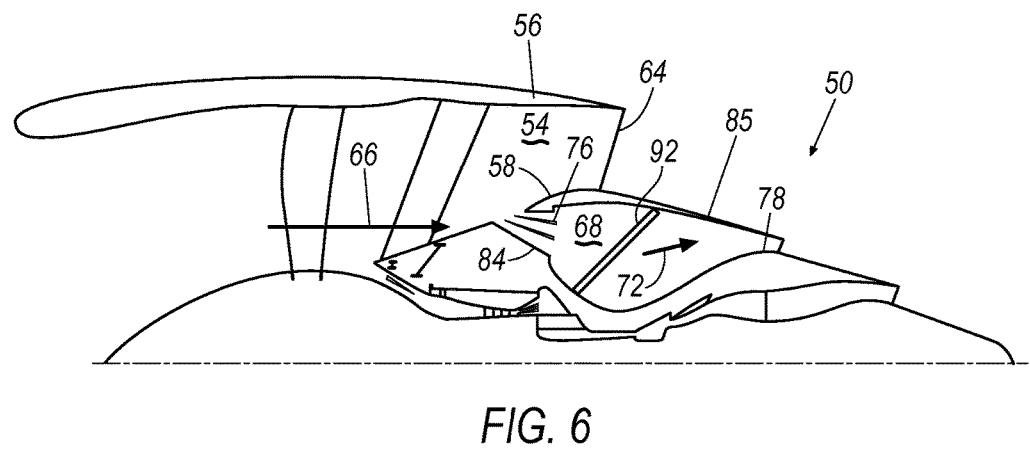
FIG. 6 illustrates an exemplary secondary bypass duct having a canted microchannel or minichannel heat exchanger.

Referring now also to the embodiment of FIG. 6, an exemplary secondary bypass duct 68 having a canted microchannel or minichannel heat exchanger 92 is shown comprised of a plurality of canted segments that are positioned circumferentially around and spaced apart from the centerline 28 of the engine 50. In the present embodiment, the outer cowl 85 is spaced from the inner shroud 58 of the fan bypass duct 54. A heat exchanger 92 is radially inwardly canted forcing the secondary bypass air 72 to turn radially outward in order to flow through the heat exchanger 92. The nozzle 78 discharges the secondary air 72 downstream of the throat 64 of the fan bypass nozzle 56. It will be appreciated that the heat exchanger 92 could be canted aft with inward flow as shown or alternatively the heat exchanger 92 could be canted forward with outward flow (not shown).

It will be appreciated that the heat exchanger 86, 88, 92 and 94 may be made of geometric configurations other than the samples that are depicted herein. Likewise, the heat exchangers may be positioned within the secondary chamber 68 in orientations that are different than those depicted herein.

It will be further appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A system for providing intercooling to an engine, comprising:
    a fan bypass duct communicating with fan bypass air, said fan bypass duct having a fan bypass duct nozzle and disposed about a centerline of the engine;
    a secondary bypass duct radially inwardly spaced from said fan bypass duct, said secondary bypass duct having an inlet with a diffuser for decelerating air passing therethrough, said secondary bypass duct in communication with said fan bypass duct for directing a portion of the fan bypass air from the fan bypass duct to said secondary bypass duct, said secondary bypass duct having an outlet in communication with the bypass air at a location downstream of a throat of said fan bypass duct nozzle and comprising a secondary bypass duct nozzle disposed at said outlet of said secondary bypass duct; and
    one of a microchannel or minichannel heat exchanger disposed about an entire annulus of the engine and within said secondary bypass duct to receive the portion of the fan bypass air that passes into said secondary bypass duct, and oriented non-perpendicularly with respect to the centerline of the engine, said one of a microchannel or minichannel heat exchanger in communication with a heat transfer fluid.

2. The system of claim 1, further comprising the diffuser disposed near said inlet of said secondary bypass duct.

3. The system of claim 1, further comprising a secondary bypass duct nozzle disposed at said outlet of said secondary bypass duct.

4. The system of claim 1, wherein said inlet of said secondary bypass duct is downstream of a converging section of said fan bypass nozzle.

5. The system of claim 1, wherein said fan bypass duct nozzle has an inner radius defined by a core cowl that is radially inwardly spaced from an inner surface of a nacelle.

6. The system of claim 1, wherein said inlet of said secondary bypass duct is part of the core cowl.

7. The system of claim 1, wherein the one of said microchannel or minichannel heat exchanger is comprised of a plurality of pleated segments.

8. The system of claim 1, wherein the one of said microchannel or minichannel heat exchanger has a pleated configuration having segments that extend axially and radially in a direction that is circumferential with respect to the centerline.

9. The system of claim 1, wherein the diffuser is disposed circumferentially about the annulus of the engine and near said inlet of said secondary bypass duct.

10. A secondary bypass duct for providing cooling to an engine, said secondary bypass duct comprising:
    an outward cowl radially spaced from an inward cowl forming an annulus, at least a portion of said outward cowl forming at least a portion of an inner surface of a fan bypass duct, the fan bypass duct having a nozzle;
    an inlet in communication with said annulus for directing a portion of fan bypass air from the fan bypass duct and into said annulus;
    a diffuser proximate the inlet for decelerating the portion of fan bypass air that is directed into the annulus, the diffuser disposed circumferentially about the engine;
    an outlet positioned downstream of the inlet, said outlet is spaced downstream of a throat of a fan bypass nozzle, the outlet comprising a secondary bypass duct nozzle disposed at the outlet; and
    at least one microchannel or minichannel heat exchanger disposed fully circumferentially about the engine and within said annulus and oriented non-perpendicularly with respect to the centerline of the engine, said one of a microchannel and minichannel heat exchanger in communication with a fluid to transfer heat from the engine to cooling air.

11. The bypass duct of claim 10, wherein at least one of said microchannel or minichannel heat exchanger is comprised of a plurality of segments.

12. The bypass duct of claim 11, wherein at least one of said microchannel or minichannel heat exchanger segments are distributed radially within the annulus.

13. The bypass duct of claim 11, wherein at least one of said microchannel or minichannel heat exchanger segments are pleated.

14. The bypass duct of claim 10, wherein at least one of said microchannel or minichannel heat exchanger transfers heat from a core air flow of the engine.

15. A method for providing cooling to an engine, comprising:
conducting a portion of fan bypass air from a fan bypass duct to a secondary bypass duct radially inwardly spaced from said fan bypass duct form a secondary stream;
decelerating the secondary air stream entering the secondary bypass duct;
conducting the secondary air stream through a diffuser and through at least one of a microchannel or minichannel heat exchanger which is disposed about an entire annulus of the engine and within the secondary bypass duct and oriented non-perpendicularly with respect to a centerline of the engine, to transfer heat from a fluid to the secondary air stream, wherein the diffuser is disposed circumferentially about the entire annulus of the engine;
accelerating the secondary air within the secondary bypass duct; and
discharging the secondary air downstream of a throat of a fan bypass nozzle.

16. The method as set forth in claim 15, wherein the secondary air transfers heat from a core air flow of the engine.

17. The method as set forth in claim 15, wherein the secondary air is accelerated and discharged by a secondary bypass nozzle.

18. The method as set forth in claim 15, wherein the secondary air is accelerated to create thrust.

* * * * *